Patented Jan. 18, 1949

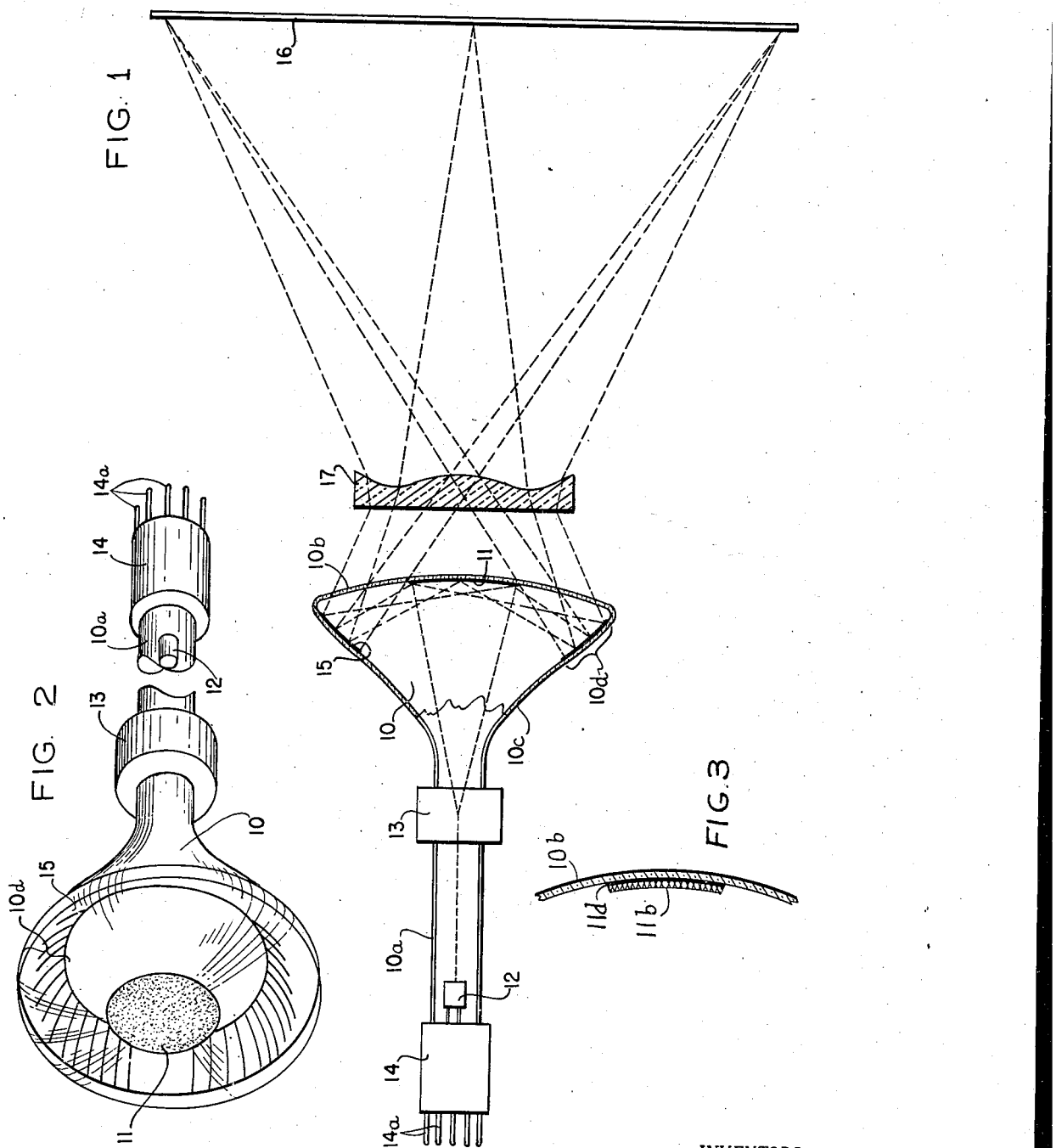

2,459,637

UNITED STATES PATENT OFFICE 2,459,637

CATHODE-RAY IMAGE-TRANSLATING DEVICE

Henry Neil Frihart, Wilbur C. Jackson, and Frederick B. Williams, Chicago, Ill., assignors to Motorola, Inc., a corporation of Illinois Application November 29, 1944, Serial No. 565,770

3 Claims. (Cl. 250—164)

This invention relates to cathode-ray image-translating devices and, while it is of general application, it is particularly suitable for embodiment in such devices designed as projection image-reproducing devices.

One form of projection image-reproducing device heretofore proposed comprised a conventional cathode-ray image-reproducing tube together with an annular spheroidal optical reflector positioned in front of the tube and reflecting an image of the fluorescent screen back around the tube. Surrounding the neck of the tube is an annular Schmidt or S-shaped lens to correct for spherical aberration of the reflector. A viewing screen is then placed behind the tube on which an image of the screen is projected. This arrangement has a number of limitations and disadvantages, among which may be mentioned the fact that it requires considerable space; the image is taken from the surface of the screen opposite to that scanned and is of reduced luminosity and impaired contrast due to dispersion and absorption of light by the fluorescent film itself; and the mechanical arrangement of such a device is inconvenient for mounting in a television receiver.

It is an object of the invention, therefore, to provide a new and improved cathode-ray image-translating device by means of which one or more of the above-mentioned disadvantages and limitations of the arrangements of the prior art may be avoided.

It is another object of the invention to provide a new and improved cathode-ray image-translating device of the projection image-reproducing type in which the image is derived from the scanned surface of the fluorescent screen, thereby procuring maximum luminous intensity and optimum contrast.

It is a still further object of the invention to provide a new and improved cathode-ray image-translating device of the type utilizing a spheroidal reflecting surface and a correcting lens which provides the simplest mechanical arrangement and occupies the least space.

In accordance with the invention, a cathode-ray image-translating device comprises an evacuated envelope, an image-forming screen at one end of the envelope, and means for developing a cathode-ray beam and scanning the screen with such beam. The device also includes an annular optical reflecting surface facing the scanned surface of the screen and effective to transmit an image to or from the scanned surface of the screen. By the term "image-forming" screen, as used herein and in the appended claims, is meant a screen which is effective to form either a visual image, as in an image-reproducing tube, or an electron image, as in an image-signal-generating tube.

In a specific and preferred embodiment of the invention, the device of the type described comprises a projection image-reproducing type of device in which the spheroidal optical reflecting surface is formed on the inner surface of the envelope and effective to project an image of the scanned surface of the screen onto a projection screen, while a Schmidt lens coaxial and concentric with the spheroidal surface is effective to correct for the spherical aberration thereof.

For a better understanding of the invention, together with other and further objects thereof, reference is had to the following description taken in connection with the accompanying drawings, while its scope will be pointed out in the appended claims.

Referring now to the drawings, Fig. 1 is a view in elevation, partly in section, of a cathode-ray image-translating device embodying the invention, while Fig. 2 is a perspective view of the device of Fig. 1. Fig. 3 is a cross-sectional view showing details of the image-forming screen.

Referring now to Figs. 1 and 2 of the drawings, there is shown a cathode-ray image-translating device comprising an evacuated envelope 10 including an elongated neck portion 10a, an enlarged end closure portion 10b, generally spherical in form and of large radius, these two portions being joined by a flared portion 10c, this latter portion including an annular section 10d having a spheroidal inner surface. It is understood that the envelope 10 will generally be of blown glass. A circular concave image-forming screen 11 is disposed at one end of the envelope 10 and preferably at or on the center of the end closure 10b. If the device is of the image-signal-generating type, the screen 11 may be in the form of a conventional dielectric mosaic, while if the device is of the image-reproducing type, the screen 11 is preferably a coating of fluorescent material. In either event, the screen 11 is preferably formed by depositing on the end closure 10b a conductive reflecting film, such as silver, which is adapted to function as an accelerating or second anode of the device, and the image-forming screen coating is then deposited on the conductive film. Fig. 3 illustrates the details of the screen 11 with the conductive film being indicated at 11a and the image-forming screen coating as 11b.

The device of Figs. 1 and 2 also includes means at the other end of the envelope and within the neck 10a for developing a cathode-ray beam and scanning the screen 11 therewith. This means may be conventional and comprise an electron gun 12 at the end of the neck 10a opposite the end closure 10b, which is effective to direct a beam of electrons, indicated by the dashed line 12a, to the screen 11, together with a scanning yoke or winding 13 surrounding the neck 10a and effective to deflect the ray 12a in two directions normal to each other to trace a rectilinear scanning pattern on the screen 11. The envelope 10 terminates in a conventional base 14 provided with suitable connection prongs 14a for insertion in a tube socket.

The image-translating device also includes an annular spheroidal optical reflecting surface, such as a silver mirror, surrounding the neck portion 10a and the screen 11 and facing the scanned surface of the screen 11. This reflecting surface may be a mirror external to the tube and surrounding the neck 10a or, as shown, it may be formed by depositing an annular mirror film 15 on the inner spheroidal surface of the section 10d of the envelope. The reflecting surface 15 is effective to transmit an image to or from the scanned surface of the screen 11; that is either to project a visual image formed on the scanned surface of the screen 11 of the device operating as an image-reproducing device onto a projection screen 16, or alternatively, the screen 16 may constitute an object being televised and an image thereof transmitted by the spherical reflecting surface 15 to the scanned surface of a mosaic screen 11.

It is well known that an optical spheroidal reflecting surface introduces spherical aberration into a transmitted image. To correct for this effect, there is disposed a correcting lens in the image-transmitting path between the screen 11 and the screen 16. In the specific embodiment shown, this correcting lens is a Schmidt or S-shaped lens 17 of conventional type disposed coaxial and concentric with the spheroidal reflecting surface 15.

The operation of the image-translating device of the invention will be clear to those skilled in the art from the foregoing description. However, for completeness, its operation may be described while functioning as a projection image-reproducing device. In such an arrangement, a signal-modulated cathode-ray beam projected by the electron gun 12 and deflected by the scanning yoke 13 is effective to scan and activate the fluorescent screen 11 to develop thereon a visual image of the object being televised in a conventional manner. In accordance with the invention, however, rather than viewing this visual image directly from the front of the screen 11, the image on the rear or scanned surface of screen 11 is picked up by the spheroidal reflecting surface 15 and transmitted or projected to the viewing screen 16. At the same time, spherical aberration introduced by the spheroidal reflector 15 is corrected by the Schmidt lens 17 to provide a faithful and accurate reproduction of the image on the viewing screen 16.

The arrangement described has a number of advantages. In the first place, the correcting Schmidt lens 17 has its center placed at the center of the spheroidal surface 15 which in practice may be only a few inches in front of the face of the envelope 10, thus minimizing space requirements. In the second place, the image is picked up from the scanned surface of the screen 11, at which surface the illumination is of highest intensity and of maximum contrast, since dispersion of and absorption of the image by the fluorescent film itself is avoided. Furthermore, by depositing the fluorescent screen on a mirrored conductive surface, as described, and connecting this surface to act as a second or accelerating anode of the device, local charging of elemental areas of the screen 11 is avoided and dispersion of the scanning beam minimized, thereby ensuring a smaller spot size, greater intensity of the scanning beam, and a maximum contrast and definition. The Schmidt lens 17 need not be a ground optical lens but may be formed of molded thermosetting plastic, for example methyl methacrylate resin, commercially available under the trade name "Lucite" or polyvinyl resin commercially available under the trade name "Vinylite," or other equivalent transparent plastics.

While it will be apparent that the physical dimensions of the device described will vary in accordance with particular installation requirements, one group of satisfactory essential dimensions may be as follows:

| | Inches |
|---|---|
| Envelope 10: | |
| End closure 10b—diameter | 12 |
| Overall length | 16 |
| Screen 11—diameter | 5 |
| Image size at screen 11 | 3 x 4 |
| Image size at screen 16 | 18 x 24 |
| Correction lens 17—diameter | 8 |

In order to obtain by a conventional simple lens system a result comparable to that provided by the device described, the simple lens system would require a 9 inch lens 3.3 inches from the screen 11 and having an f factor (ratio of focal length to diameter) of 0.37. On the other hand, the best commercially available lens for this purpose at present has an f factor of 1.5. From this, it may be seen that the device described has a speed approximately four times that of the best commercial lens system available.

While there has been described what is at present considered to be the preferred embodiment of the invention, it will be apparent to those skilled in the art that various changes and modifications may be made therein without departing from the spirit or scope of the invention.

What is claimed as new is:

1. A cathode-ray image-translating device comprising, an evacuated envelope of insulation material having a concave end surface, a conductive reflecting film deposited on said concave end surface of said envelope and adapted to function as an accelerating anode, an image-forming screen deposited on said conductive film, means for developing a cathode-ray beam and scanning said screen therewith, said beam striking the concave surface of said screen, and an annular optical reflecting surface formed on the inner surface of said envelope and facing the scanned surface of said screen and effective to transmit an image from said scanned surface of said screen.

2. A cathode-ray image-translating device comprising an evacuated envelope of transparent material including an elongated neck and an enlarged concave end closure joined by a flared intermediate portion, an image-forming screen disposed centrally on said end closure so that an annular window is formed about said screen, means for developing a cathode-ray beam and scanning said screen therewith, said screen being positioned directly on said concave end closure and presenting a concave surface to said cathode-ray beam, and an annular optical reflecting surface formed on said intermediate portion and facing said screen and said window to provide a continuous light path between said screen and said window.

3. A cathode-ray image-translating device comprising an evacuated envelope of transparent insulating material including an elongated neck and an enlarged concave end closure joined by a flared portion having a spheroidal inner surface, an image-forming screen disposed centrally on said end closure so that an annular window is formed about said screen, means for developing a cathode-ray beam and scanning said screen therewith, said screen being positioned directly on said concave end closure and presenting a concave surface to said cathode-ray beam, and an annular optical reflecting surface formed on said spheroidal surface and facing said screen and said window to provide a continuous light path between said screen and said window.

H. NEIL FRIHART.
WILBUR C. JACKSON.
FREDRICK B. WILLIAMS.

REFERENCES CITED

The following references are of record in the file of this patent:

UNITED STATES PATENTS

| Number | Name | Date |
|---|---|---|
| 2,029,639 | Schlesinger | Feb. 4, 1936 |
| 2,129,015 | Loewe | Sept. 6, 1938 |
| 2,166,399 | Dowsett et al. | July 18, 1939 |
| 2,185,239 | Ardenne | Jan. 2, 1940 |
| 2,292,979 | Wald | Aug. 11, 1942 |
| 2,305,855 | Epstein | Dec. 22, 1942 |
| 2,327,144 | Stam | Aug. 17, 1943 |
| 2,373,396 | Hefele | Apr. 10, 1945 |
| 2,440,735 | Cawein | May 4, 1948 |

FOREIGN PATENTS

| Number | Country | Date |
|---|---|---|
| 463,891 | Great Britain | Apr. 8, 1937 |
| 557,771 | Great Britain | Dec. 3, 1943 |
| 815,094 | France | Apr. 5, 1937 |

OTHER REFERENCES

The Principles of Optics, Hardy and Perrin, McGraw-Hill Book Co., Inc., N. Y., 1932 (page 1540). Copy in Div. 7.